July 5, 1932.  J. F. MacINDOE  1,865,932
PRESSURE COUPLING FOR LUBRICATION
Filed Sept. 24, 1927   2 Sheets-Sheet 1
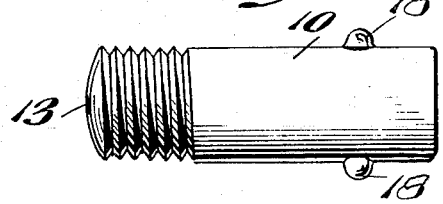
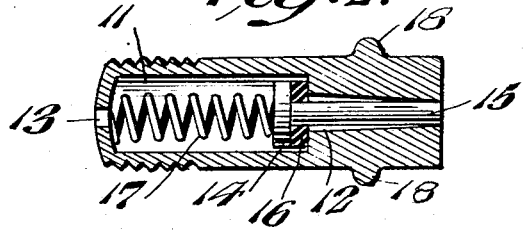
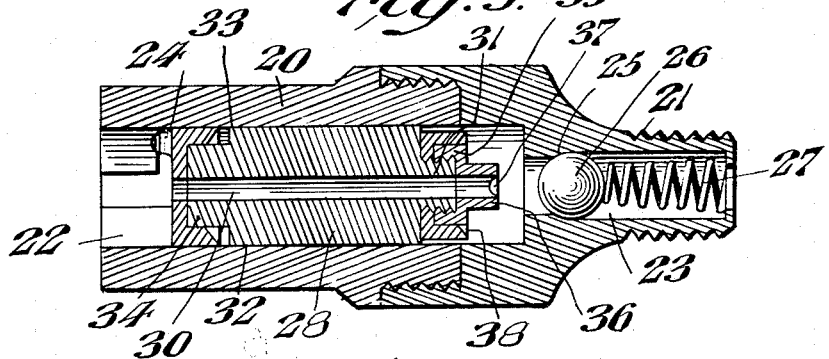
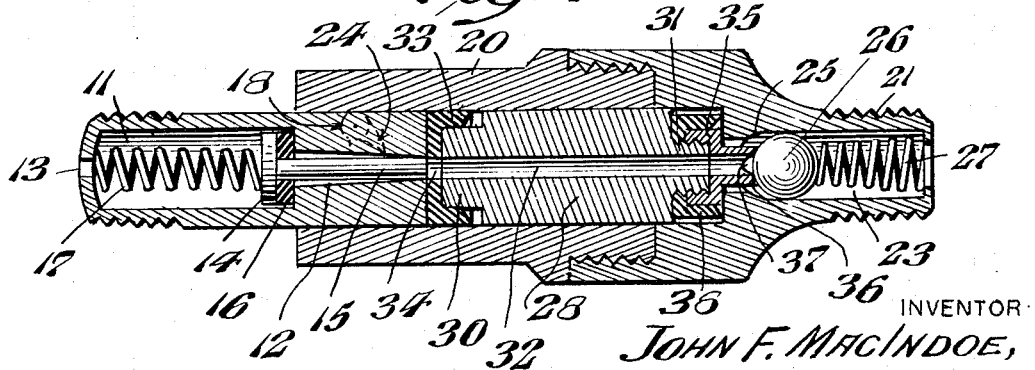
INVENTOR
JOHN F. MACINDOE,
BY
Robert M. Barr
ATTORNEY.

July 5, 1932.  J. F. MacINDOE  1,865,932

PRESSURE COUPLING FOR LUBRICATION

Filed Sept. 24, 1927  2 Sheets-Sheet 2

INVENTOR
John F. MacIndoe,
BY Robert M. Barr
ATTORNEY

Patented July 5, 1932

1,865,932

UNITED STATES PATENT OFFICE

JOHN FRANKLIN MacINDOE, OF EAST FALLS, PENNSYLVANIA

PRESSURE COUPLING FOR LUBRICATION

Application filed September 24, 1927. Serial No. 221,700.

The present invention relates to lubricating fittings and more particularly to coupling devices for attaching a source of grease under pressure to a bearing or to a lubricator for supplying such bearing.

Some of the objects of the present invention are to provide an improved means for introducing grease from a grease gun to a bearing and to a lubricator of the pressure type; to provide an improved nipple coupling for use in lubricating systems; to provide a coupling wherein an automatic positive seal against leakage forms an important feature; to provide a self closing nipple and self closing coupling for pressure actuated lubricating system; to provide a grease gun nipple which forms an unobstructed passage for the introduction of grease; to provide an improved check valve nipple; to provide a leak-proof pressure coupling; and to provide other improvements as will hereinafter appear.

Figure 5:
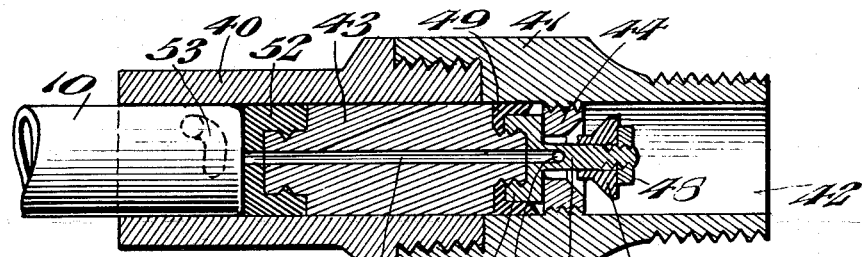
Figure 6:
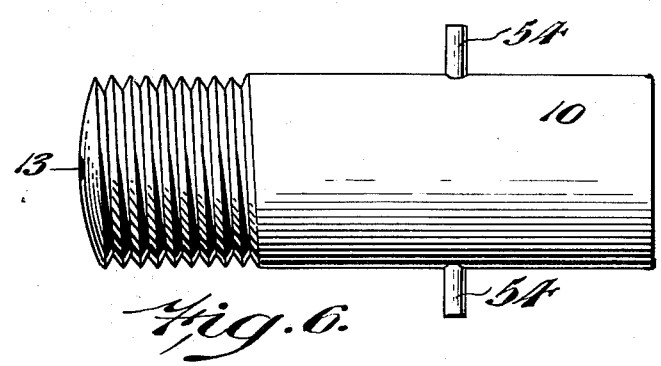
Figure 7:
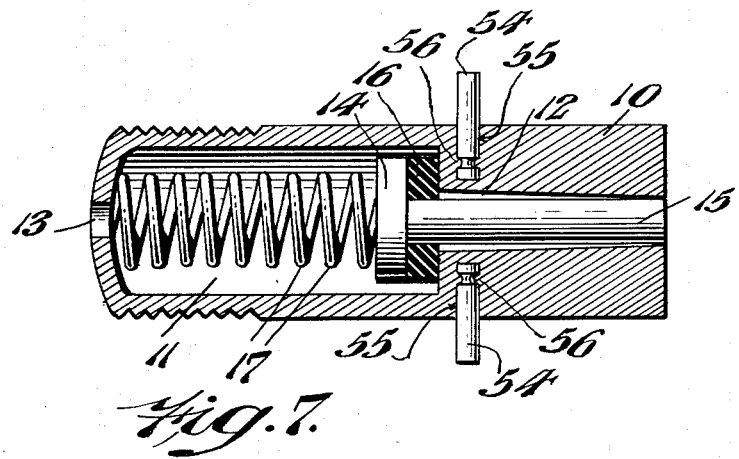

In the accompanying drawings Fig. 1 represents a side elevation of a nipple embodying one form of the present invention; Fig. 2 represents a longitudinal section through the same; Fig. 3 represents a longitudinal section of one form of coupler for cooperation with the fitting of Figs. 1 and 2; Fig. 4 represents a longitudinal section of the fitting and coupler in assembled condition; Fig. 5 represents a longitudinal section of a modified form of coupler; Fig. 6 represents a side elevation of another type of nipple embodying the present invention; and Fig. 7 represents a longitudinal section of the nipple of Fig. 6.

Referring to the drawings one form of the present invention includes as a part, a nipple 10 having a tubular end portion forming a chamber 11 arranged for communication with an inlet passage 12 formed in the other portion of the nipple 10 and in axial alignment with a discharge port 13 at the opposite end of the nipple 10. The end of the nipple 10, in which the port 13 is located, is spun over to enclose the parts of the control valve mechanism. This mechanism, in the present instance, consists of a disc valve 14 having a stem 15 extending into the inlet passage 12 and carrying a washer 16 which serves to seal the inlet passage 12 by pressure of the valve 14 under the action of a coil spring 17. Since the spring 17 is interposed between the nipple end and the valve 14 and is normally under compression, the valve 14 will hold the washer 16 in leak proof relation to the inlet end of the nipple. Preferably the valve stem 15 terminates substantially flush with the end of the nipple when the washer 16 is new and hence if wear occurs on the washer such as to reduce its thickness, there will be a corresponding protruding of the end of the valve stem 15 so that it becomes in this way an indicator or measurer of the wear conditions of the valve washer.

In order to facilitate the inflow of grease under exterior pressure, the inlet passage 12 is preferably tapered, that is increases in diameter gradually from its receiving end to its discharge end and in this way provides a larger pressure area of grease upon the face of the washer 16 to ensure prompt opening for use.

As a means for attaching a grease gun to the nipple for introducing grease, and to permit the ready removal thereof after the filling operation, the nipple 10 is provided with two radially projecting bead lugs 18 for cooperation with a bayonet joint structure upon the coupling or other cooperating part. In this instance the distance from the receiving end of the nipple to the lugs 18 is different from the standard distance in order that the nipple 10 can only cooperate with the particular coupling here shown though obviously the location of the lugs 18 can be changed to a standard distance if desired. The advantage in so locating the lugs 18 is that only one particular pressure gun can be used with the nipple.

The discharge end of the nipple 10 is provided with an exterior thread for screwing the nipple into its permanent position upon a bearing, a grease cup or any other part to which grease is to be delivered.

In order to provide a leak proof connection between the nipple 10 and the source of lubricant under pressure, a coupler sleeve 20 is provided having a threaded shank 21 for attachment to a grease gun or other pressure device and provided with a bore 22 opening into a reduced bore 23 through the shank 21. The bore 22 is of uniform diameter and of a size to snugly receive the receiving end of the nipple 10, and the latter is detachably connected to the coupler sleeve 20 by bayonet slots 24 to receive the bead lugs 18 of the nipple 10. Preferably the coupler sleeve 20 is made of two parts with screw threaded connection.

For the purpose of controlling the flow of lubricant through the coupler and preventing leakage of the same under the filling pressure, the shank bore 23 is provided with a valve seat 25 and a ball 26 seats thereon in leak proof relation under the action of a coil spring 27. The bore 22 receives a movable element or plunger 28 having extension ends 30 and 31 of reduced diameter and is provided with an axially disposed passage 32 for delivering the lubricant from the receiving end of the coupler sleeve to the discharge end. The extension end 30 carries a leather cup washer 33 having an opening 34 aligned with the passage 32 and in assembled relation the annular wall of the washer 33 forms a seal preventing leakage between the plunger 28 and the coupler sleeve. Also this washer 33 provides a plane surface to abut and fit flush against the entering face of the nipple 10. The extension end 31 is threaded to receive a lock nut 35 carrying a tubular neck 36 which projects axially into the shank bore 23 and serves to lift the ball valve 26 from its seat when the plunger 28 is moved toward the shank end of the coupler sleeve. One or more ports 37 are formed in the end of the neck 36 so that when the neck lifts the valve 26 from its seat these ports 37 will allow free flow of the lubricant into the passage 32. The lock nut 35 also serves to retain a cup washer 38 fast to the face of the plunger 28 with its annular wall encircling the nut 35. This arrangement allows the incoming lubricant to forcibly press the washer 38 outwardly against the walls of the bore 22 and prevent escape of lubricant except by its proper channel through the passage 32.

In operation the discharge end of the coupling sleeve 20 is slipped over the end of the nipple 10 with the bayonet slots 24 respectively in position to receive the lugs 18 and the two parts are then pressed together and the sleeve 20 given a partial turn, when the lugs 18 are properly seated at the end of the slots 24, to lock the parts in cooperating position. When this takes place the entering end of the nipple 10 has seated flush against the face of the washer 33 and has shifted the plunger 28 to the right as seen in Fig. 4 and caused the projecting neck 36 to lift the ball valve 26 from its seat 25. Lubricant under pressure is now able to pass around the valve 26, pass through the ports 37 and traverse the passage 32 until it meets the end of the nipple stem 15. When this occurs the pressure exceeding that of the spring 17 moves the valve 14 away from its seat so that the nipple chamber 11 is filled with lubricant and discharges through port 13 to the cup, or bearing, or other lubricant receiving device. This travel of the lubricant through the nipple 10 is materially assisted by the increasing size of the passage 12, which causes the chamber 11 to fill quickly, after which the continued feeding pressure causes the grease to be discharged through the port 13. When the bearing is fully lubricated, or the pressure lubricator is filled, the coupling sleeve is detached by giving it a partial turn to release the bayonet connection. The pressure of the spring 17 at once closes the passage 12 by forcing the valve washer 16 to its seat, while the end of the stem 15 seals the inlet to the nipple.

In the form of the coupler shown in Fig. 5, a construction has been devised wherein the use of springs for reciprocating purposes is unnecessary and the coupler control valve operates automatically by means of a created vacuum. In this construction the coupler sleeve 40 and coupler end 41 have a through bore 42 of uniform diameter which receives the piston valve 43 for sliding movement therein. A valve seat 44 is fixed at the proper location in the bore 42 by threading or otherwise and cooperates with a shut-off valve 45 which is carried by the neck 46 of a nut 47 threaded to the end of the piston 43. A lock nut 48 retains the parts in proper assembled condition. A cup washer 49 encircles the reduced end of the piston 43 in order to prevent leakage along the joint between the parts of the coupler. The valve 45 controls the inlet port 50 to the through discharge port 51 and is normally closed but opens when the nipple 10 enters the discharge end of the sleeve 40 to cause the piston 43 to move to the right as seen in Fig. 5. A washer 52 is interposed between the end of the piston 43 and the nipple 10 to prevent leakage and may be of the cup type shown or any other suitable for the purpose. The nipple 10 and sleeve 40 are preferably joined by a bayonet joint 53, though obviously any suitable connection may be employed.

In the operation of this type of coupling, the piston 43 occupies its most advanced position with the valve 45 closed when the coupler sleeve is detached from the grease nipple and is so held by the pressure of the grease in the connected grease gun. When the end of the sleeve 40 telescopes over the nipple 10, the latter contacts with the washer 52 and forces the piston 43 in the direction to lift the valve 45 and consequently the grease under pressure passes under the valve 45, through the port 50 to port 51 and thence by way of the nipple 10 to the bearing or the bearing supplying grease cup. It should be noted that the valve 45 is relatively large so that a minimum opening movement provides for a free flow of grease and yet allows a quick closing action. Also the position of the valve seat 44 is such as to permit sufficient movement of the piston 43 for valve opening purposes.

As soon as the cup filling or bearing supplying action is completed, the coupler is disengaged from the nipple 10 by giving it a partial turn and then a straight outward pull which latter action creates a vacuum, which, aided by some trapped pressure back of valve 45, quickly shifts the piston 43 to the left, (as seen in Fig. 5) causing the valve 45 to seat on valve seat 44, thus preventing an escape of grease out of open end of sleeve 40.

In Figs. 6 and 7 a nipple construction similar to that shown in Figs. 1 and 2 is illustrated but having a modified form of bayonet pin for connection purposes. Those elements which are common to the form shown in Fig. 2 are given like reference numerals to avoid confusion and for the sake of brevity of description. In this form of the invention, the nipple 10 is provided with two radially projecting pins 54 for cooperation with a bayonet joint structure upon the grease gun, grease gun coupler or other cooperating part.

In order to secure the pins 54 rigidly in place and without obstructing the passage 12, the nipple 10 is drilled with two holes 55 respectively of a size to receive the pins 54 with a tight driving fit, and to anchor the pins therein each has a circumferential groove 56. When the pins 54 are driven in, the body of the nipple is swaged by a hammer blow or subjected to pressure in a press to cause the metal of the nipple body opposite to the grooves 56 to flow into such grooves and thus prevent the pins 54 from becoming detached. This construction avoids the objections present in ordinary bayonet joints, where there is a single pin passing through the body of the nipple, and allows a free unobstructed passage for the grease.

It will now be apparent that a complete unitary coupling device has been devised for receiving grease from a source under pressure and delivering it to a point of use in a practical, efficient manner, and without the faults of nipples and connectors in present day use. For example, in nipples as heretofore constructed having spring pressed ball check valves, as well as valves of metal construction, leakage has been a common fault under the back pressure of the grease, this being particularly troublesome where the nipple is part of a pressure operated grease cup. Also leakage occurs in the ordinary nipples when the bayonet joint pin extends across the grease passage. In the nipple of the present invention, these disadvantages have been entirely overcome because the control valve is not located in the supply passage itself but in a separate chamber and since the valve seat is relatively large and closed by a gasket of cork or equivalent material there is a positive closing of the valve under all conditions. Furthermore, the valve parts are removed from the grease inlet and the latter is practically closed by the end of the stem 15 so that no dirt or the like can find its way into the valve to cause leakage. A further advantage in the present nipple is the shifting of the stem 15 in proportion to the wear of the washer 16, so that when the stem 15 projects a distance corresponding substantially to the washer thickness, it is an indication that a new washer is required.

In connection with the coupling sleeve construction it should be noted that the piston cylinder is of uniform diameter without shoulders or other limit stops. No springs are necessary for actuating purposes since all operations are positive and by direct pressure action and vacuum. When the filling of a lubricator or bearing is completed and the coupler sleeve is removed from the nipple, the piston or plunger 28 automatically advances toward the bayonet slot part of the sleeve but cannot pass beyond that part on account of the partial vacuum produced in the chamber at the opposite end of the plunger. This movement of the plunger 28 withdraws the neck 36 from the ball valve 26 and hence the spring 27, aided by the vacuum created by the forward movement of the piston 28, forces the ball to its seat.

What is claimed as new and useful is:

1. A coupling mechanism comprising a coupling sleeve provided with a bore having a portion of reduced diameter, a valve controlling said bore, means normally holding said valve closed, an elongated plunger slidable in said bore having a plane transverse face on one end of the same area as the bore and a through passage, means on the end opposite said face to move said valve to open position, in combination with a nipple arranged to enter said bore and having a plane transverse face of the same area as the plunger face and adapted to seat flush against said face, the arrangement being such that the entering movement of said nipple causes said plunger means to open said valve and the withdrawing movement of said nipple breaks said flush relation to produce a vacuum and thereby automatically return said plunger and close said valve.

2. A lubricating coupling mechanism comprising in combination, a coupling sleeve provided with a bore therethrough having a reduced portion at one end, said reduced portion providing a valve seat, a spring pressed valve arranged to normally contact with said seat, an elongated plunger of uniform diameter mounted for sliding movement in said bore, an extension on one end of said plunger arranged to pass through said valve seat, said plunger having a passage therethrough in coaxial relation with the bore of reduced diameter, the other end of said plunger having a plane transverse face of the same area as the bore, and a nipple entering said bore having a face of the same area as the plunger face to seat flush against the end of said plunger and having an inlet and an outlet, said inlet being located in coaxial relation with respect to said passage and gradually increasing in size from its point of contact with said plunger, and a spring pressed valve for controlling said inlet.

3. A lubricating coupling system comprising in combination a nipple and a coupling sleeve having a control bore to receive said nipple at one end and an inlet bore at the other end, a check valve in said inlet bore, a plunger slidable in said bore and arranged to be moved toward said inlet bore by the flush engagement of said nipple during interconnection of said sleeve and nipple, said coacting faces of the nipple and plunger each being of an area equal to the transverse area of the bore whereby the plunger is adapted to be moved away from said inlet bore by the vacuum produced by the breaking of said flush engagement as said nipple is withdrawn, said plunger having a passage therethrough for establishing communication between said inlet and said nipple, and means for unseating said valve during one movement of said plunger.

Signed at Philadelphia, county of Philadelphia, State of Pennsylvania, this 22nd day of September, 1927.

JOHN FRANKLIN MacINDOE.